Figure 1:
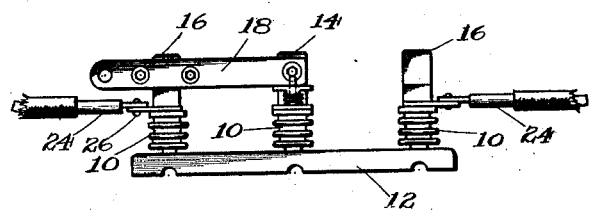
Figure 2:
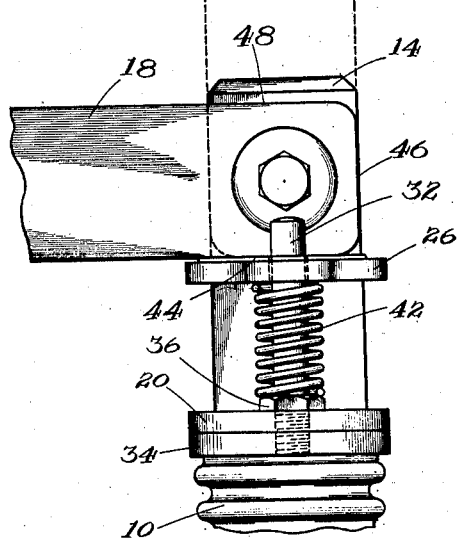
Figure 4:
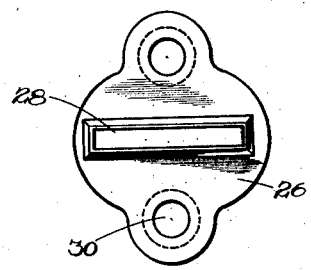
Figure 5:
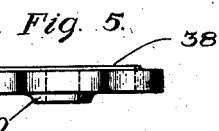
Figure 3:
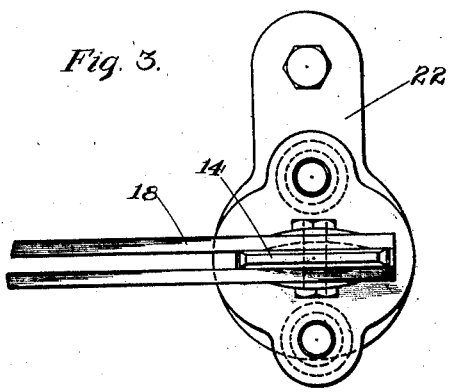

Feb. 9, 1926.

E. H. JACOBS 1,572,209

SWITCH

Filed Sept. 15, 1921    2 Sheets-Sheet 1

Inventor
Ernest H. Jacobs
By Brown Boettcher & Dienner
Attys.

Feb. 9, 1926.
E. H. JACOBS
SWITCH
Filed Sept. 15, 1921
1,572,209
2 Sheets-Sheet 2
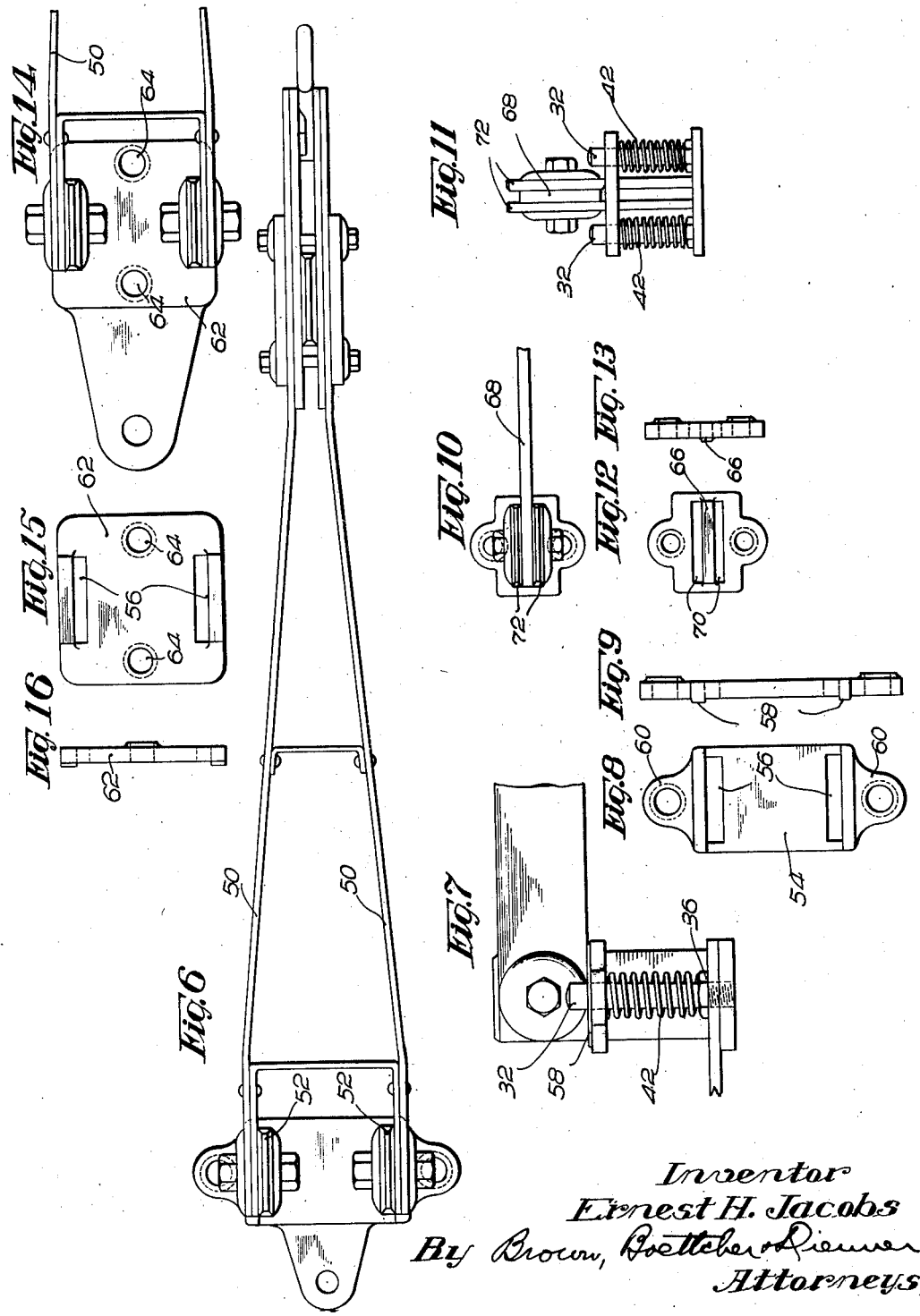
Inventor
Ernest H. Jacobs
By Brown, Boettcher & Dienner
Attorneys